(12) United States Patent
Harada et al.

(10) Patent No.: US 10,061,562 B2
(45) Date of Patent: *Aug. 28, 2018

(54) RANDOM NUMBER GENERATOR IN A PARALLEL PROCESSING DATABASE

(71) Applicant: Pivotal Software, Inc., Palo Alto, CA (US)

(72) Inventors: Hitoshi Harada, Foster City, CA (US); Caleb E. Welton, Foster City, CA (US); Florian Schoppmann, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/431,749

(22) PCT Filed: Sep. 28, 2013

(86) PCT No.: PCT/US2013/062498
§ 371 (c)(1),
(2) Date: Mar. 26, 2015

(87) PCT Pub. No.: WO2014/052942
PCT Pub. Date: Apr. 3, 2014

(65) Prior Publication Data
US 2015/0278309 A1    Oct. 1, 2015

Related U.S. Application Data

(63) Continuation-in-part of application No. 13/631,923, filed on Sep. 29, 2012, now Pat. No. 8,874,602.

(51) Int. Cl.
*G06F 17/30* (2006.01)
*G06F 7/58* (2006.01)

(52) U.S. Cl.
CPC ............... *G06F 7/58* (2013.01); *G06F 7/582* (2013.01); *G06F 17/30545* (2013.01)

(58) Field of Classification Search
CPC .............................................. G06F 17/30445
See application file for complete search history.

(56) References Cited

U.S. PATENT DOCUMENTS 5,793,657 A    8/1998    Nemoto
5,878,426 A    3/1999    Plasek et al.
(Continued)

OTHER PUBLICATIONS

Coddington, "Random Number Generators for Parallel Computers," Syracuse University, Apr. 1997, 26 pages.
(Continued)

*Primary Examiner* — Mohammad S Rostami
(74) *Attorney, Agent, or Firm* — Fish & Richardson P.C.

(57) ABSTRACT

A random number generation process generated uncorrelated random numbers from identical random number sequences on parallel processing database segments of an MPP database without communications between the segments by establishing a different starting position in the sequence on each segment using an identifier that is unique to each segment, query slice information and the number of segments. A master node dispatches a seed value to initialize the random number sequence generation on all segments, and dispatches the query slice information and information as to the number of segments, during a normal query plan dispatch process.

25 Claims, 8 Drawing Sheets

(56) References Cited

U.S. PATENT DOCUMENTS

| | | | |
|---|---|---|---|
| 6,899,221 B2 | 5/2005 | Luo et al. | |
| 8,874,602 B2 | 10/2014 | Harada et al. | |
| 2005/0131893 A1* | 6/2005 | Von Glan | G06F 17/30445 |
| 2007/0250524 A1* | 10/2007 | Le | G06F 17/30404 |
| 2007/0294508 A1 | 12/2007 | Sussman et al. | |
| 2009/0055422 A1* | 2/2009 | Williams | H03M 7/30 |
| 2009/0077011 A1 | 3/2009 | Natarajan | |
| 2009/0132488 A1* | 5/2009 | Wehrmeister | G06F 17/30545 |
| 2011/0153662 A1 | 6/2011 | Stanfill et al. | |
| 2011/0302226 A1* | 12/2011 | Abadi | G06F 17/30569 707/825 |
| 2011/0313999 A1* | 12/2011 | Bruno | G06F 17/30463 707/718 |
| 2014/0095526 A1 | 4/2014 | Harada et al. | |

OTHER PUBLICATIONS

Gentle, "Simulating Random Numbers from a Unifoiiii Distribution," *Random Number Generation and Monte Carlo Methods* (Second Edition), 2005, Chapter 1, pp. 1-56.

International Search Report and Written Opinion in International Application No. PCT/US2013/062498, dated Jan. 31, 2014, 10 pages.

Schoppmann, "Generating pseudo-random numbers in parallel using random ( )," *Confluence*, retrieved on Sep. 17, 2012, http://confluence.greenplum.com/display/~schopf/2012/04/24/Generating+pseudo-random+numbers+in+parallel+using+random%28%29, 2 pages.

\* cited by examiner

Seg1

| id | category | price | random | [predicate] |
|----|----------|-------|--------|-------------|
| 1  | A        | 500   | 0.3439 | TRUE        |
| 2  | B        | 900   | 0.7839 | FALSE       |
| 3  | A        | 800   | 0.215  | TRUE        |

Seg2

| id | category | price | random | [predicate] |
|----|----------|-------|--------|-------------|
| 4  | C        | 700   | 0.5193 | FALSE       |
| 5  | A        | 600   | 0.1139 | TRUE        |
| 6  | B        | 500   | 0.8799 | FALSE       |

Figure 8 ical tables. Obtaining random numbers that satisfy these
RANDOM NUMBER GENERATOR IN A PARALLEL PROCESSING DATABASE

BACKGROUND

This invention relates to random number generation in parallel processes, and more particularly to random number generation in massively parallel processing (MPP) systems such as databases.

Random number generators are used in many applications. They use iterative deterministic algorithms for producing a sequence of pseudo-random numbers that approximate a random sequence. It is important that the generators have good randomness properties and that the sequence be uniformly distributed, uncorrelated, reproducible and easily changed by adjusting an initial seed value. Parallel random number generators running on parallel processors in a distributed system, such as a MPP database, in addition should produce the same sequence on different processors, have no correlation between the sequences, and produce good quality random numbers. MPP database systems require good quality random numbers for analytic workloads such as Monte Carlo simulation and for random sampling of physical tables. Obtaining random numbers that satisfy these requirements from parallel computers is difficult, particularly in MPP databases where the number of nodes that process a query is not known in advance, and where communications between processors is impractical.

In a distributed database system, if each segment node initializes with the same seed and the processes pick up the sequence numbers at the same positions, the random numbers will be the same and are not of good quality. On the other hand, if each segment node starts with different seed values and thus generates different sequences, the returned values of the random numbers may overlap each other so that the quality is unpredictable, which is unacceptable. It is important to ensure that the segments of the MPP database generate the same sequence but return different numbers at the different positions in the sequence on different segments. It might be possible to accomplish this if the segments were able to communicate with one another. However, this is not feasible in an MPP database where low latency is essential and there may be thousands of segments.

It is desirable to provide random number generators for MPP databases that address the foregoing and other known problems of generating quality random numbers and distributed processing systems, and it is to these ends that the present invention is directed.

DESCRIPTION OF PREFERRED EMBODIMENTS

The invention is particularly well suited to massively parallel processing (MPP) databases, such as shared-nothing databases, and will be described in that context. However, as will be appreciated, this is illustrative of only one utility of the invention, and the invention is applicable to parallel processing generally.

Figure 1:
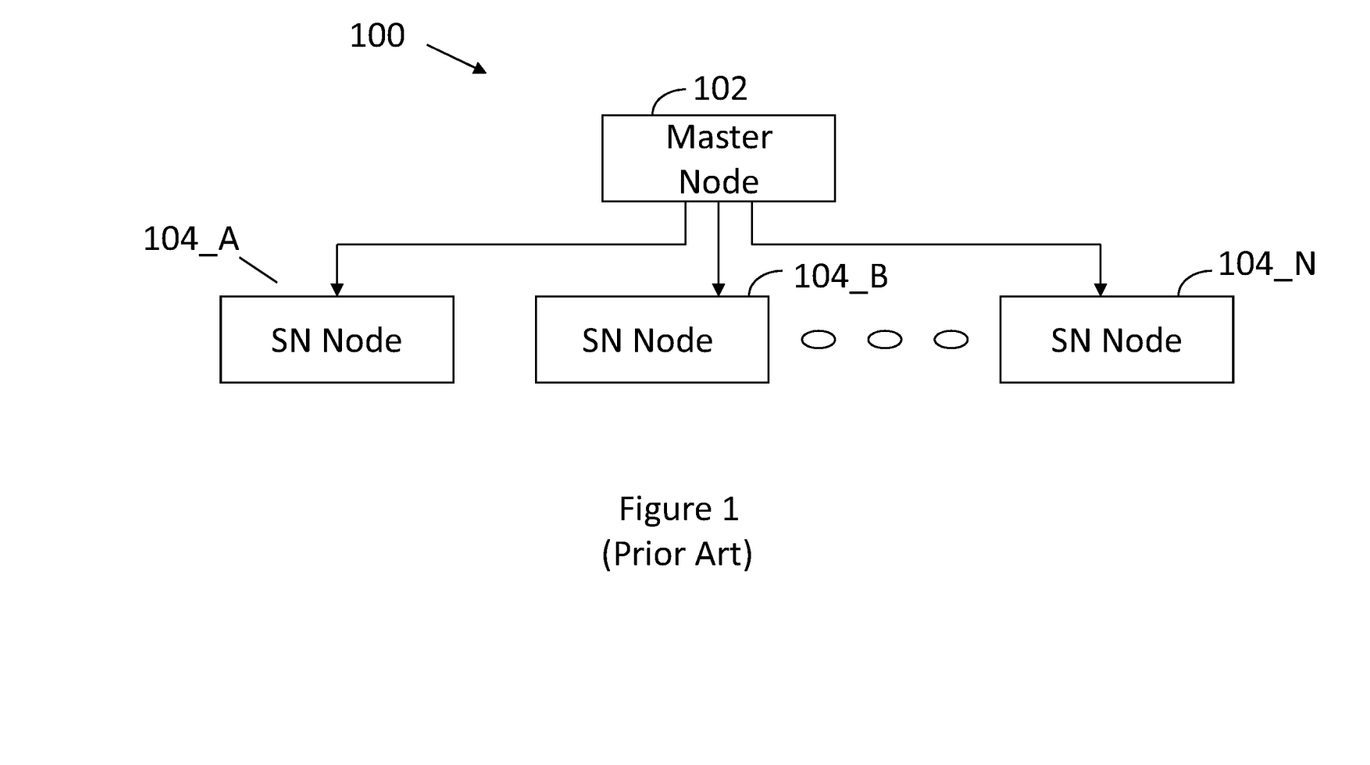
FIG. 1 is a block diagram of an MPP shared-nothing database system of the type with which the invention may be employed.

FIG. 1 illustrates a shared-nothing database system 100 of the type with which the invention may be employed. As shown, the system 100 may include a master node 102 and a set of shared-nothing nodes or segments 104_A through 104_N. Each shared-nothing segment 104 may have its own processor(s), local memory, disks and input/output devices and operate independently of other segments in the system. Each node may be self-sufficient, sharing nothing across the network. Therefore, there are no points of contention across the system and no sharing of system resources. The advantage of this architecture is that it is highly scalable.

Figure 2:
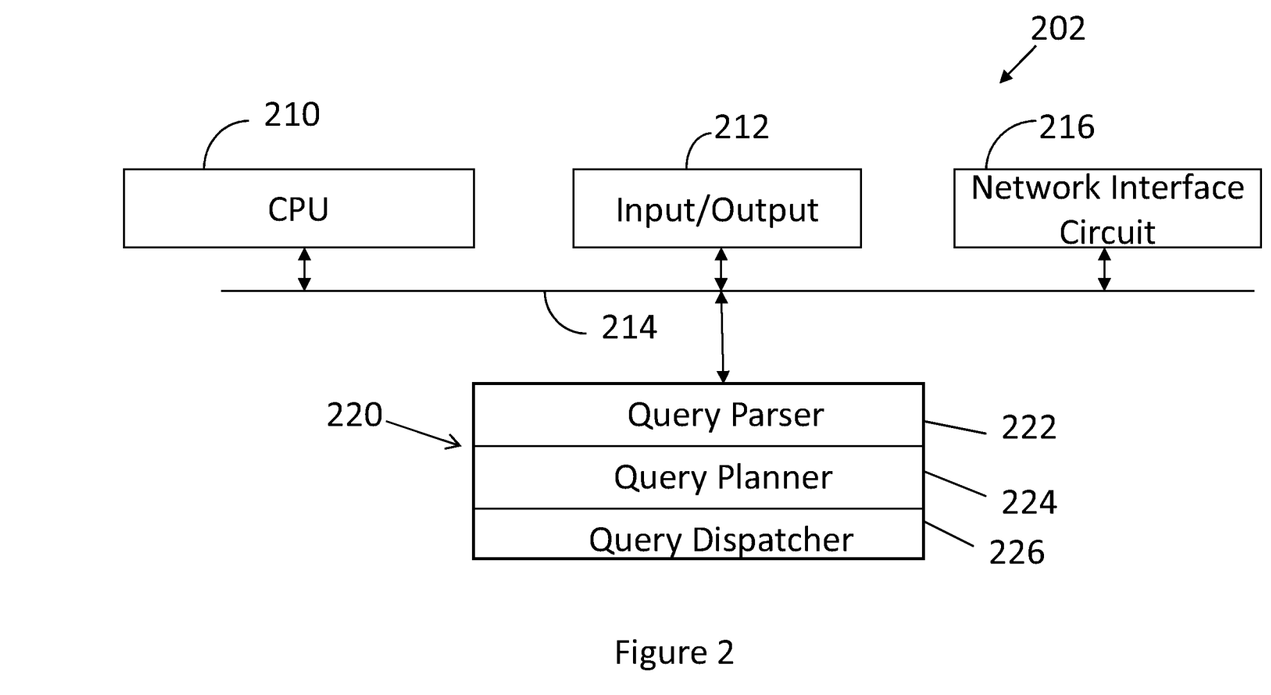
FIG. 2 is a block diagram illustrating the architecture of a master node of the database system of FIG. 1.

FIG. 2 illustrates the architecture of a master node 202 of the database system 100 that is configured to implement operations in accordance with the invention. The master node 202 may include standard components, such as a processor or CPU 210, which may comprise a multi-CPU processor. The CPU may be connected to input/output devices 212 via a bus 214. The input/output devices 212 may include standard components, such as a keyboard, mouse, display, printer and the like. A network interface circuit 216 may also be connected to the bus 214, allowing the master node 202 to operate in a networked environment.

A memory 220 may also be connected to the bus 214. The memory 220 comprises computer readable media that stores executable instructions that control the operation of the computer to implement embodiments of the invention. The instructions afford, for example, a query parser 222 that interprets a database query, checks for correct syntax, and builds a data structure (e.g., a tree) to represent the query. The memory may also store instructions that afford a query planner or query optimizer 224. The query planner 224 processes the output from the query parser and develops a query plan to execute the query. A query plan specifies a set of operations that are used to access or modify the data associated with the query. Details, such as how to access a given data relation, in which order to join data relations, sort orders, and so on, may form part of a query plan. For a given query, a large number of query plans may be generated. A query optimizer may evaluate the costs of all possible query plans for a given query and determine the optimal, i.e., most efficient plan for executing the query. Once a query plan is selected, it is passed to the query dispatcher 226 which deploys the query plan across a set of shared nothing nodes for execution.

The segment nodes 104 may have architectures similar to the master node, except that they have data stores, such as disk drives, that constitute a local database, and need not have instructions that provide a query parser, query planner or query dispatcher. Instead, their memories will store instructions for executing the operations specified by the query plan on their individual databases, and for returning the results to the master node.

Figure 3:
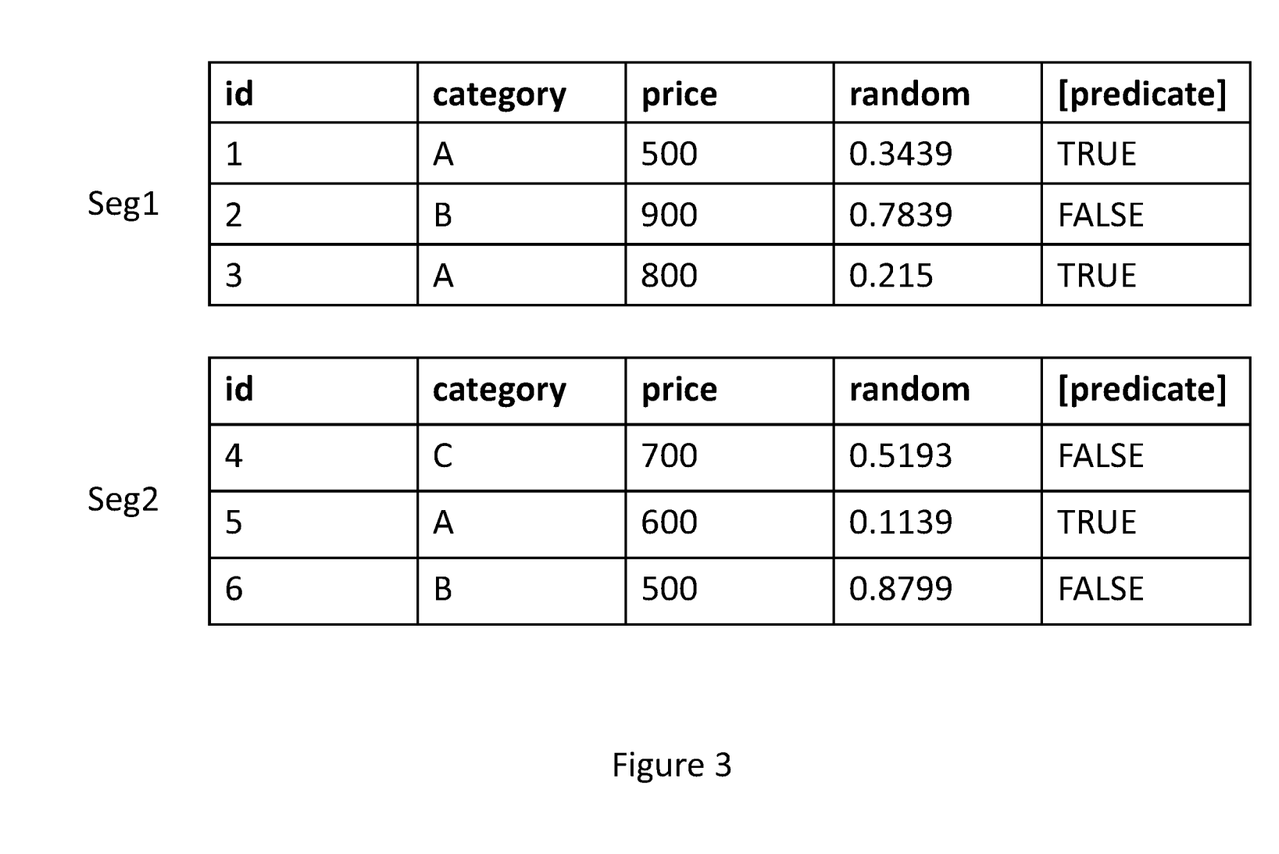
FIG. 3 is a diagrammatic view illustrating random row sampling on tables in different segments.

FIG. 3 is a diagrammatic view that illustrates the operation of a structured query language (SQL) random( ) operation in obtaining uniformly distributed random values across separate processes. The figure illustrates random row sampling on a table where each row has an identifier ("id") and lists data that includes a category and a price. As shown, the table in this example has six rows which are split between two different segments. As indicated in the figure, a first segment, Seg1, includes three rows, row id's 1-3 of the table, and a second segment, Seg2, includes row id's 4-6 of the table. For a query:

SELECT id, category, price, random( ) FROM tbl WHERE random( )<0.5 and assuming that the random( ) operation produces the random values for each row as shown in the tables, the predicate of the query is true for rows 1, 3 and 5, as indicated in the figure, since these rows have random values less than 0.5. Thus, the query will return the data in these three rows.

In order to achieve maximum parallelism for complicated queries during query execution, the master node may divide a query plan into slices and assign a process to each subdivided slice of the query plan on a segment node. A slice is a portion of the query plan that can be worked on independently at the segment level. Each slice is executed on all segments, and has an associated process on each segment. A query plan may be sliced, for instance, whenever a motion node occurs in the plan. A motion node is a portion of a query execution plan that indicates data movement between database instances (between segments and between segments and the master node).

Figure 4:
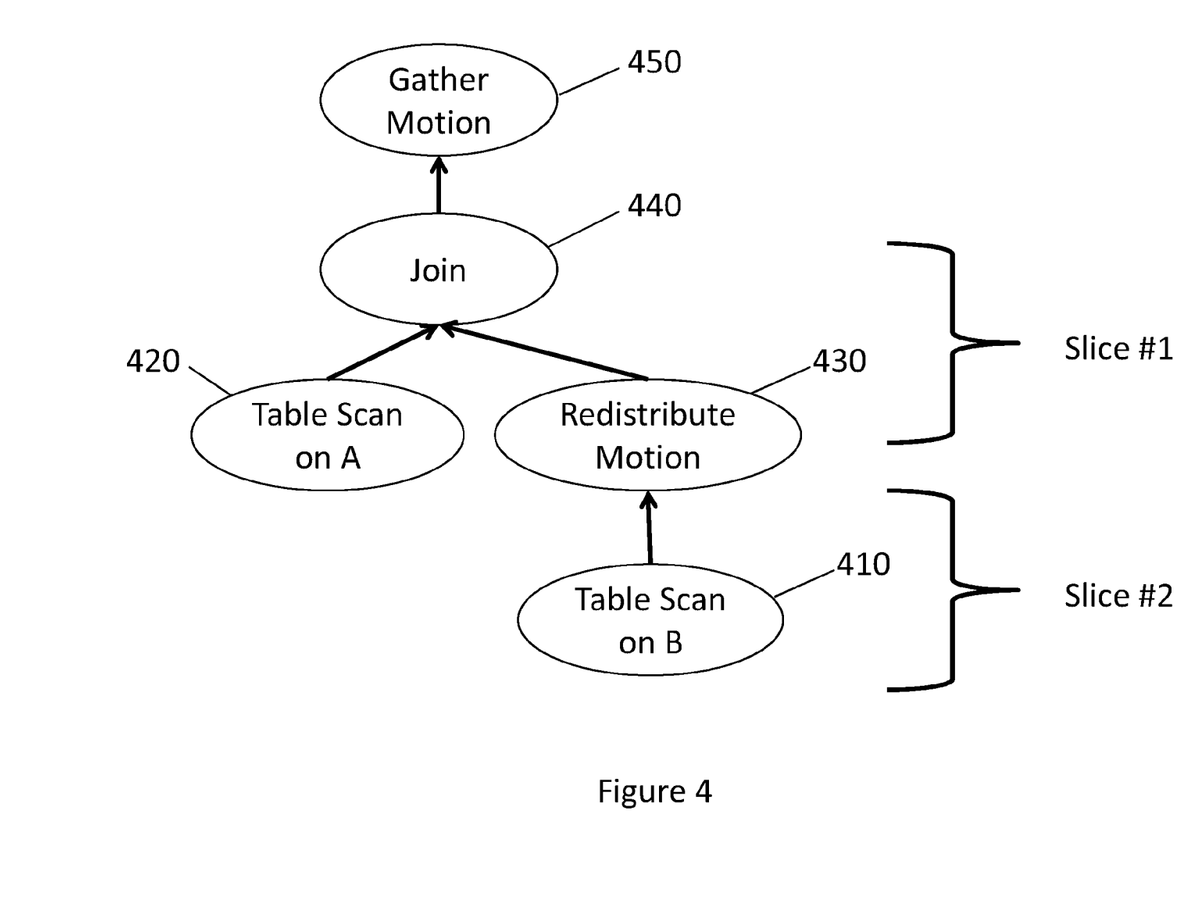
FIG. 4 is a diagrammatic view illustrating the partitioning of a query plan for a complex query into slices.

FIG. 4 illustrates an example of the partitioning of a query plan 400 by the master node into two slices Slice #1 and Slice #2. Assume that the query plan 400 involves a table scan 410 on a table B, a table scan 420 on a table A, a redistribute motion operation 430 on the results of the scan on table B to align the distribution of the returned data to match the distribution on table A, a join operation 440 to join the results of the scan 420 on table A and of the redistribute motion operation 430, and a gather motion operation 450 to gather the results of the join operation 440 from the segments on the master. The query plan 400 may be subdivided into two slices for execution, as previously described. Slice #2 may comprise the table scan 410 on table B, and Slice #1 may comprise the table scan 420 on table A, the redistribute motion operation 430, and the join operation 440. In practice, the master node will dispatch the slices to all segments in a cluster for execution as a separate process on each segment.

As described above, when executing a random operation on different segments of a MPP distributed database it is important to obtain uniformly distributed uncorrelated random values across the separate segments. Preferably, each segment that executes a random( ) process generates the same random sequence that is preselected in order to afford uncorrelated random values of a desired quality. Causing each segment to produce the same sequence is achieved by starting with the same initialization seed value for the random number generator on each segment. The problem is ensuring that the independent random values returned on the different segments of the cluster of the distributed database do not collide or correlate. Addressing this problem is difficult in a distributed parallel processing environment. One approach to minimizing correlation and collision in parallel processors which generate the same sequence is to stagger the starting points of the random number sequence and to appropriately select the sequence step size at which random number values are selected based upon the number of different processes. Unfortunately, the number of processes is not known in advance and cannot be pre-selected and fixed since this depends upon the query plan. Furthermore, in a large MPP distributed database having many segments, it is impractical for the processors in the segments to communicate with one another in order to coordinate starting points and step sizes, particularly so where the number of processors that process a given query is not known in advance.

The invention addresses this problem, as will be described, by communicating certain information from the master node to the segments which the segments use to initialize and their random number generators. This information ensures that the random number sequence generated by each segment processor is identical among the segments, and also that the sequence is unique and different for each different query so that the random( ) operations for different queries are uncorrelated. The master also communicates further information to the segments that each segment combines with segment-specific information that is specific to and already available each segment, such as a unique segment identifier, to determine a different starting position in the random number sequence at that segment. The master additionally communicates information to the segments that determines the step size in the random number sequence used by the segments. Thus, each segment generates an identical random number sequence for a particular query having a starting position on the segment that is different from the starting position on other segments, but each segment has the same step size in the sequence. As a result, the random numbers returned at each segment are independent random values of good quality and consistency that have a little or no probability of collision or correlation. The way in which the invention accomplishes this is described below.

Figure 5:
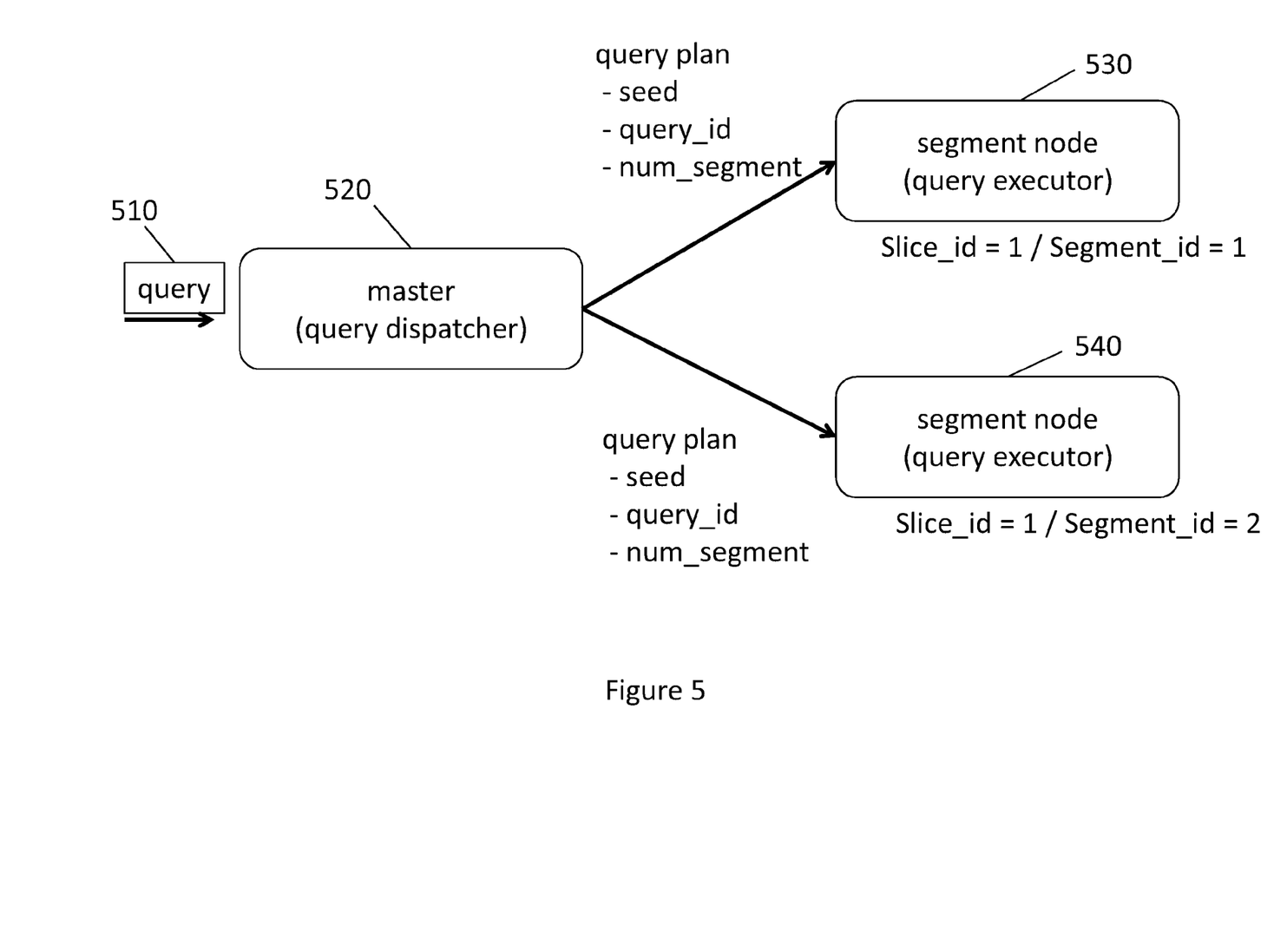
FIG. 5 is a diagrammatic view illustrating the distribution of the slices of a query plan to different processing segments.

FIG. 5 is a diagrammatic view that illustrates the distribution of slices of a query plan to different segments of the MPP database, and shows the types of information that is dispatched by the master node to each segment node. As indicated in the figure, a query 510 received by the master node 520 is processed by a query parser and a query planner to generate a query plan, as previously described in connection with FIG. 2. The query dispatcher of the master node dispatches the query plan the segments of the database cluster. For purposes of illustration and ease of description, it is assumed in this example that they are two query executor segment nodes or segment workers, i.e., segment 1, 530, and segment 2, 540, and that the query plan is sliced to produce a slice that involves generation of a random number sequence. As shown in FIG. 5, the slice may be given a slice identifier, slice_id=1 by the master node, and the two segments may have segment identifiers segment_id=1, and segment_id=2. The query dispatcher on the master node 520 dispatches the query plan to the two segment nodes 530 and 540. In addition to the query plan, the master node may also dispatch to each segment a selected seed value which is used by the two segment nodes for generating the same random number sequence at each segment node, a query identifier (query_id) that identifies the query 510, and a value corresponding to the number of segment nodes (num_segment) that process the query. Since the master knows the degree of parallelism in the query plan, it knows the number of slices and the number of segments (num_segment) that process a slice. Each segment node thus has a slice process identifier, slice_id, that identifies a particular slice of the query plan, and a unique segment identifier. In this example, there are two segment nodes 530 and 540 having segment identifiers (segment_id) segment_id=1 and segment_id=2, respectively, and one slice having a slice identifier slice_id=1, as shown.

Figure 6:
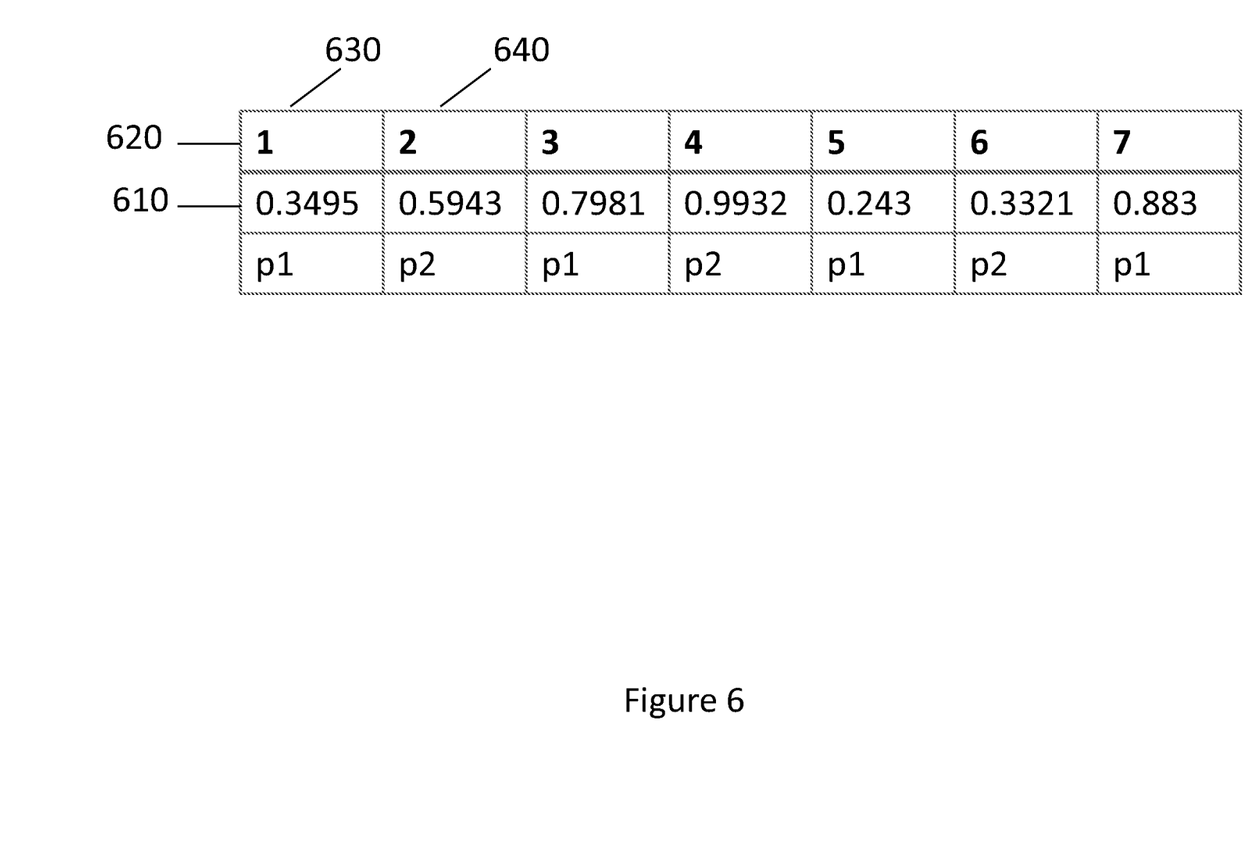
FIG. 6 is a diagrammatic view illustrating the random generator sequence initialization on the processing segments of FIG. 5.

FIG. 6 illustrates a random number generation sequence initialization process in accordance with the invention. Slice 1 has corresponding processes, p1 and p2, respectively, on the two segments nodes 530, segment_id=1, and 540, segment_id=2. Each process has a (seed, query_id) identifier and calls an operator setseed(seed<<16|query_id) to generate identical random number sequences having sequence values 610 as indicated in FIG. 6. The starting position 620 on each segment may be established by using the slice identifier, Slice_id, and the segment identifier, Segment_id that identifies the segment. The starting position (pos) 620 of the random number sequence on each segment may be determined in accordance with an embodiment using the slice identifier, the number of segments, and the segment identifier in a relationship:

pos=(slice_id−1)*num_segment+segment_id

For slice_id=1 and two segments (num_segment=2), from the above relationship the starting position for selecting a random number in the sequence 620 on the first segment (segment_id=1) for process p1 corresponding to slice_id=1 is pos=1, as indicated at 630 in FIG. 6. Likewise, the starting position in the random number sequence on the second segment (segment_id=2) for the first slice using the above relationship is pos=2, as indicated at 640. Thus, the starting position in the random sequence on each segment is determined by query identifier information (slice_id), information as to the number of segments to which the query plan is dispatched from the master, and by specific segment identifier information that is unique to and available at each segment.

Figure 7:
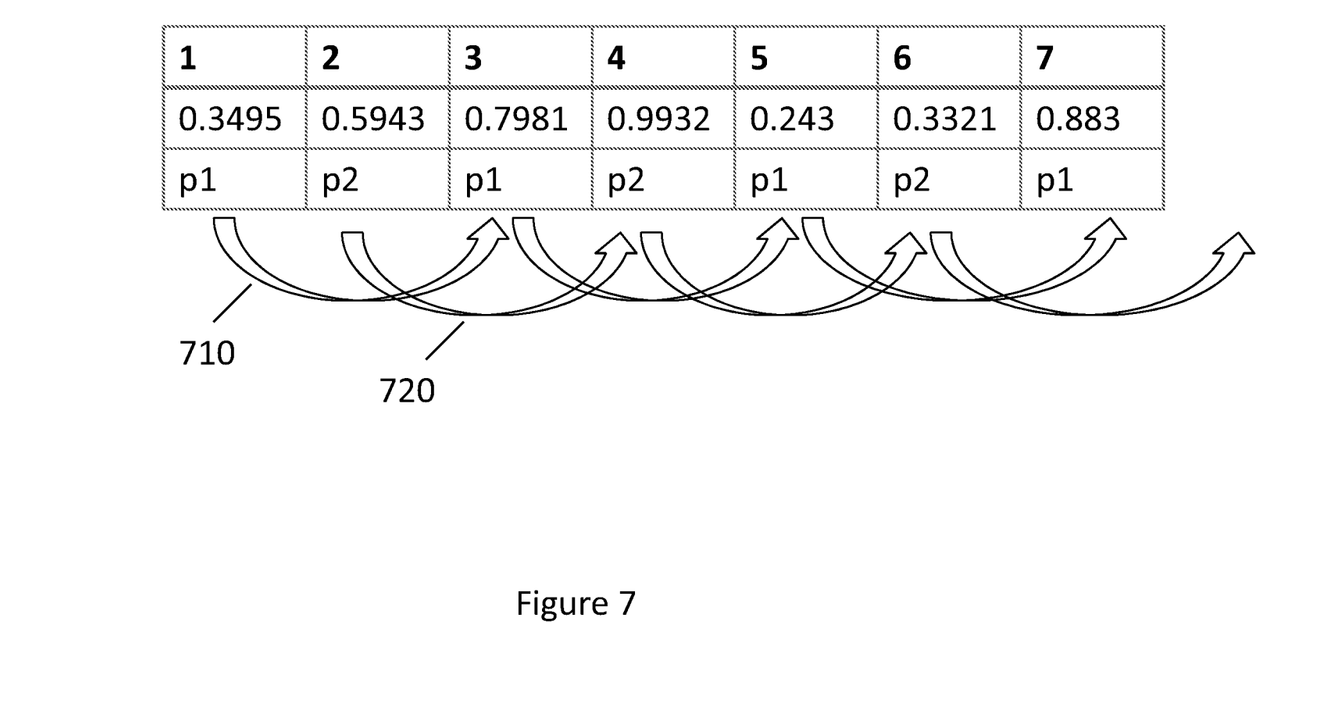
FIG. 7 illustrates a process in accordance with the invention for returning random numbers at different positions in the sequence as the random number generators on different processors advance with the same step size.

Next, in accordance with an embodiment, the step size in the random sequence that each segment uses to return random numbers from the sequence is determined by the number of processes, i.e., slices, spawned by the query planner the master node, i.e., step size=num_process, where num_process is the number of processes (slices). This information is sent to all segments by the master node. Continuing with the same example as above, and referring to FIG. 7, since there are two slices, i.e., processes, p1 and p2, the step size in the sequence on each segment is two positions, as illustrated in FIG. 7 at 710, 720. Thus, as illustrated in the figure, process p1 starts at position 1 in the random number sequence and returns the random number 0.3495. The process then successively steps two positions to positions 3, 5 and 7, respectively, to return the random numbers at those positions. Similarly, process p2 starts at position 2 in the random number sequence and returns the random number 0.5943. Process p2 then successively steps two positions in the sequence to return the random numbers at positions 4, 6, etc. By using a step size in the random number sequence corresponding to the number of processes spawned by a particular query to return random numbers, the invention minimizes the likelihood of collisions and correlations between the random numbers returned.

In a MPP distributed database, the number of parallel processes spawned will change based upon the particular incoming query pattern, and this number is known to the master node as a result of the query planning process. By using the query identifier of the incoming query and a seed value, both of which may be stored at the master and by using the number of slices spawned by the query, the same pattern of queries can return consistent random values. The master node sends this information to the segments as part of its normal query dispatching communications so that each segment generates the same random number sequence. Each segment uses the information from the master node and a segment identifier that is unique to that segment to determine the segment's starting position for returning numbers from the random number sequence. Since each segment has a unique segment identifier, this ensures that each segment starts from a different position in the sequence. By using information sent by the master as to the number of slices as a step size in the sequence, the invention ensures quality, consistent random numbers that are uncorrelated and have a minimum likelihood of collision. This allows each segment to initialize its random number generator with the same starting value and to establish a different starting position in the sequence based upon information that is specific and unique to that segment. Each segment returns random numbers that are consistent, of good quality, are uncorrelated, and do no collide. Advantageously, the invention accomplishes this without the necessity of communicating information between the segments.

While the foregoing has described the invention with respect to a preferred embodiment, it will be appreciated by those skilled in the art that changes this embodiment may be made without departing from the principles and spirit of the invention, the scope of which is defined by the appended claims.

Figure 8:
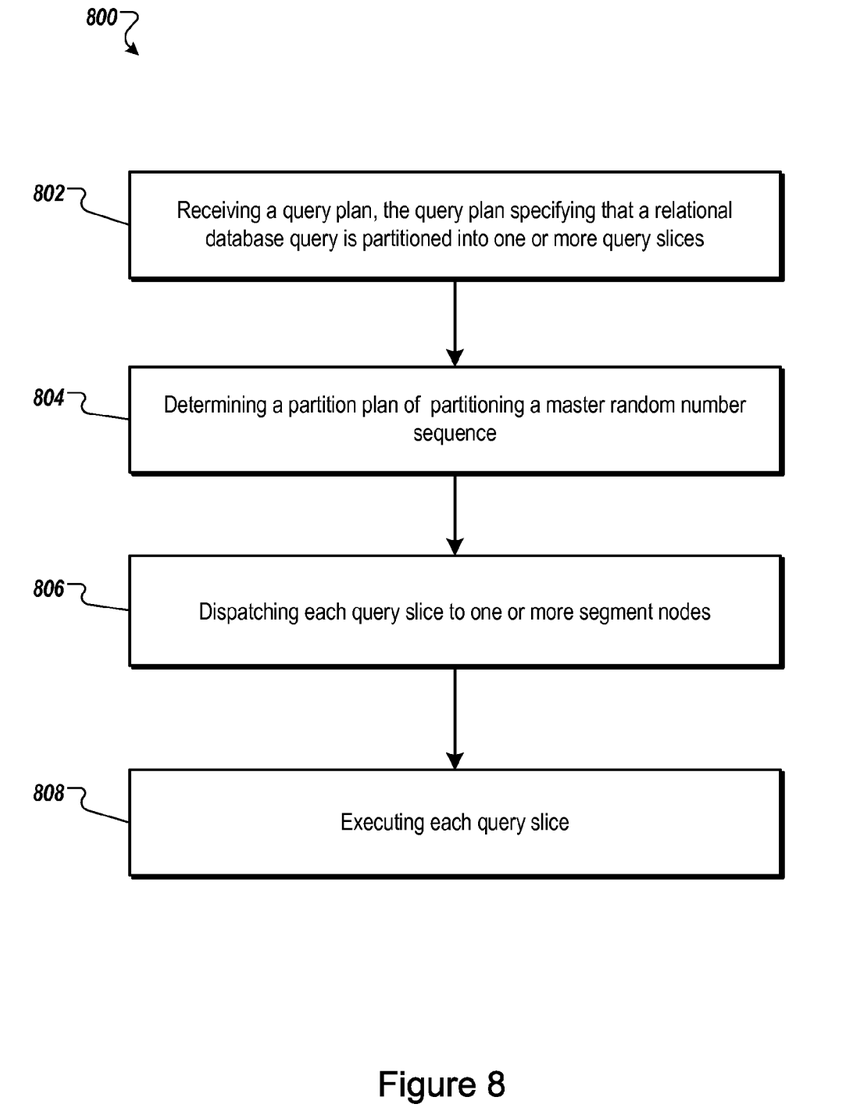
FIG. 8 is a flowchart illustrating an example process of generating uncorrelated random numbers on different nodes of a parallel processing database system based on a common master random number sequence.

FIG. 8 is a flowchart illustrating an example process 800 of generating uncorrelated random numbers on different nodes of a parallel processing database system based on a common master random number sequence. The parallel processing database system can be an MPP database system as described above.

A processor, e.g., a processor of a master node of the parallel processing database system, receives (802) a query plan. The query plan specifies that a relation database query, e.g., a SQL query, is partitioned into one or more query slices. Each query slice is a portion of operations of the query. Each query slice is executable on one or more segment nodes independently of another query slice. Each segment node is a node of the parallel processing database system having multiple nodes each having a processor that is independent of a processor of another node.

For example, the processor can receive the following example SQL query.

```
SELECT *, random()
FROM
(SELECT *, random() from table_1) t1
    JOIN (SELECT *, random() from table_2) t2 ON (t1.x = t2.y)
```

In the query above, the random( ) function will be called in each of the query slices of the plan. If the plan is a multi-slice plan, the techniques discussed in this specification can be used to guarantee lack of correlation between the random number sequences in individual distributed processes, e.g., in each query slice executing on each segment node. Based on structures of table_1 and table_2 and based on how the two tables are distributed among segment nodes, a query planner of the parallel processing database system may determine to partition the SQL query into one query slice, two query slices, three query slices, or more. Each query slice can be a singleton slice or a distributed slice. A singleton slice is a slice distributed to and executable on one node of the parallel processing database. A distributed slice is a slice distributed to and executable on each segment node of the parallel processing database system.

The processor determines (804) a partition plan of partitioning a master random number sequence to each of the segment nodes. Operations of determining the partition plan include determining a step size and an offset based on a count of query slices and a count of segment nodes of the parallel processing database system. Each different combination of segment node and query slice can use the step size and offset to specify uncorrelated subsets of the master random sequence. A larger count of query slices and a larger count of segment nodes correspond to a larger step size.

For example, a parallel processing database system can have N segment nodes, each having an identifier S1 through SN. A master node of the parallel processing database system receives a SQL query and partitions the SQL query into four query slices, Q1 through Q4. Table 1 below illustrates a partition plan of partitioning a master random number sequence using step size and offset.

TABLE 1

| Query Slice | Slice Type | Contribution to Step Size | Offset on S1 | Offset on Si | Offset on SN |
|---|---|---|---|---|---|
| Q1 | Distributed | N | 1 | i | N |
| Q2 | Singleton | 1 | N + 1 | Not Applicable | Not Applicable |
| Q3 | Distributed | N | N + 1 + 1 | N + 1 + i | N + 1 + N |
| Q4 | Distributed | N | 2*N + 1 + 1 | 2*N + 1 + i | 2*N + 1 + N |

The step size is the number of distributed slices multiplied by the number of segment nodes plus the number of singleton slices. In the example of Table 1, there are three distributed slices, Q1, Q3, and Q4, and one singleton slice, Q2. The step size is 3*N+1. The processor multiplies the count of segment nodes by the number of distributed slices among the query slices, and designates a sum of a count of singleton slices and a product of the multiplying as the step size. When each query slice is a distributed slice, the processor can designate a product of the count of query slices and the count of nodes of the parallel processing database system as the step size. When each query slice is a singleton slice, the processor can designate the count of query slices as the step size.

Each query slice on each segment node has a unique offset. The offset is determined based on a position of a particular query slice in an ordered list of query slices. The order can be based on various criteria. For example, query slices can be ordered by a query slice identifier. A component of the offset of a particular query slice is calculated by multiplying the number of segment nodes and a number of distributed query slices preceding the query slice and adding the product of the multiplication by a number of singleton slices preceding the query slice. The offset of the query slice on each segment node can further be calculated by adding a position of the segment node in an ordered list of segment nodes to the component. The list of segment nodes can be ordered by various criteria, e.g., by an identifier of each segment node.

For example, for query slice Q3, there is one distributed slice, Q1, and one singleton slice, Q2, before Q3. The offset of query slice Q3 on segment node S1 is the product of N and 1, plus one, then plus the position of S1. In this case, the position of S1 is 1. Accordingly, the offset of Q3 on S1 is N+1+1=N+2. A random function in Q3 executing on S1 will return a series of random numbers N+2+k*step_size, where k is a sequence of non-negative integers, e.g., 0, 1, 2, . . . .

The processor dispatches (806) each query slice to at least one of the segment nodes according to the partition plan. Dispatching the query slices includes designating a different subset of the master random sequence to each different query slice and segment node combination based on the step size and the offset. Each offset corresponds to a position of a segment node in an ordered list of segment nodes and a position of the query slice in an order list of query slices. The processor dispatches each distributed slice to each segment node, and dispatches each singleton slice to one of the segment nodes.

The parallel processing database system executes (808) each query slice on one or more segment nodes. When a query slice includes a random function, e.g., random( ) each segment node executing the query slice returns a random number in response. The random number is a number in the master random number sequence selected based on the step size and offset as described above in reference to Table 1. In some implementations, the master node of the parallel processing database system dispatches a common seed value to each segment. Each segment node, when executing a query slice, can generate the master random number sequence using the common seed. The segment node can then select a subset of random numbers from the master random number sequence using the step size, the offset corresponding to the segment node, and a position of the segment node in the ordered list of segment nodes.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

A parallel processing database described in this specification is a database system including multiple computers. The computers in the system are connected through a real-time communication network, e.g., the Internet. The computers can form clusters, each computer being a node in the cluster. The computers can be programmed to perform a task by dividing the task into multiple fragments, each fragment being performed by a node independently. The computers can be programmed to provide performance of various tasks as a service. Some examples of the parallel processing database are Pivotal Greenplum Database® (Pivotal GPDB) and HP Vertica Analytics Platform®.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

What is claimed is:

1. A method of generating random numbers on parallel processing segments of a massively parallel processing (MPP) database, comprising:
   dividing, by a master node of the MPP database, a database query into query slices, each query slice being dispatched to multiple parallel processing segments of the MPP database for processing, each query slice being associated with a respective slice identifier;
   dispatching, by the master node to the parallel processing segments, information indicating the number of the parallel processing segments in the MPP database;
   generating a same random number sequence on each segment;
   establishing on each segment a different starting position in the random number sequence generated on said each segment, the establishing comprises establishing the starting position on each segment using a respective identifier that is unique to that segment based on the number of parallel processing segments;
   calculating a step size that determines return positions in the random number sequence generated on said each segment at which random numbers are returned, the step size being the same on all segments, the step size corresponding to a number of query slices and a number of segments, wherein a larger number of query slices and a larger number of segments correspond to a larger step size, wherein each query slice is a partition of a relational database query; and
   returning uncorrelated random numbers at said return positions in the random number sequence at said segments.

2. The method of claim 1 further comprising dispatching a common seed value to each segment from a master node of said database, and wherein said generating comprises generating the same random number sequence at each segment.

3. The method of claim 2, wherein the relational database query is an incoming query received by said master node, and wherein said dispatching further comprises including with said seed value an identifier related to said relational database query.

4. The method of claim 1, wherein calculating said step size comprises calculating a product of the number of segments in said database and the number of query slices and designating the product as the step size.

5. Computer readable non-transitory storage medium embodying instructions for controlling operations of a computer to generate random numbers on parallel processing segments of a massively parallel processing (MPP) database, comprising instructions for:
   dividing, by a master node of the MPP database, a database query into query slices, each query slice being dispatched to multiple parallel processing segments of the MPP database for processing, each query slice being associated with a respective slice identifier;
   dispatching, by the master node to the parallel processing segments, information indicating the number of the parallel processing segments in the MPP database;
   generating the same random number sequence on each segment;
   establishing on each segment a different starting position in the random number sequence generated on said each segment, the establishing comprises establishing the starting position on each segment using a respective identifier that is unique to that segment based on the number of parallel processing segments;
   calculating a step size that determines return positions in the random number sequence generated on said each segment at which random numbers are returned, the step size being the same on all segments, the step size corresponding to a number of query slices and a number of segments, wherein a larger number of query slices and a larger number of segments correspond to a larger step size, wherein each query slice is a partition of a relational database query; and
   returning uncorrelated random numbers at said return positions in the random number sequence at said segments.

6. The computer readable medium of claim 5 further comprising instructions for dispatching a common seed value to each segment from a master node of said database, and wherein said generating comprises generating the same random number sequence at each segment.

7. The computer readable medium of claim 6, wherein the relational database query is an incoming query received by said master node, and wherein said dispatching further comprises including with said seed value an identifier related to said relational database query.

8. The computer readable medium of claim 5, wherein said establishing a different starting position in the random number sequence generated on each segment comprises establishing the starting position on each particular segment using an identifier that is unique to such segment.

9. The computer readable medium of claim 5, wherein calculating said step size comprises calculating a product of the number of segments in said database and the number of query slices and designating the product as the step size.

10. A system comprising:
    a plurality of processors;
    a non-transitory storage medium storing computer instructions operable to cause the processors to perform operations comprising:
       dividing, by a master node of an MPP database, a database query into query slices, each query slice being dispatched to multiple parallel processing segments of the MPP database for processing, each query slice being associated with a respective slice identifier;
       dispatching, by the master node to the parallel processing segments, information indicating the number of the parallel processing segments in the MPP database;
    generating a same random number sequence on each segment;
       establishing on each segment a different starting position in the random number sequence generated on said each segment, the establishing comprises establishing the starting position on each segment using a respective identifier that is unique to that segment based on the number of parallel processing segments;
       calculating a step size that determines return positions in the random number sequence generated on said each segment at which random numbers are returned, the step size being the same on all segments, the step size corresponding to a number of query slices and a number of segments, wherein a larger number of query slices and a larger number of segments correspond to a larger step size, wherein each query slice is a partition of a relational database query; and returning uncorrelated random numbers at said return positions in the random number sequence at said segments.

11. A method comprising:

receiving, by a computing device, a query plan, the query plan specifying that a relational database query is partitioned into one or more query slices, each query slice being a portion of operations of the query, each query slice being executable on one or more segment nodes independently of another query slice, each segment node being a node of a parallel processing database system comprising a plurality of nodes each having a processor that is independent of a processor of another node, each query slice being a singleton slice or a distributed slice, wherein the singleton slice is executable on one segment node of the parallel processing database system and the distributed slice is executable on each segment node of the parallel processing database system;

determining a partition plan of partitioning a master random number sequence to each of the segment nodes, wherein determining the partition plan comprises determining a step size based on a count of query slices and a count of segment nodes of the parallel processing database system, wherein the step size in the partition plan is usable to specify uncorrelated subsets of the master random sequence for each different combination of a query slice and a segment node, and wherein a larger count of query slices and a larger count of segment nodes correspond to a larger step size, wherein the step size is determined based on calculations comprising:

multiplying the count of segment nodes by a number of distributed slices among the one or more query slices; and designating a sum of a count of singleton slices and a product of the multiplying as the step size;

dispatching each query slice to at least one of the segment nodes according to the partition plan, including designating a different subset of the master random sequence to each different query slice and segment node combination based on the step size and an offset, each offset corresponding to a position of a segment node in an ordered list of segment nodes and a position of the query slice in an order list of query slices; and executing each query slice, including returning a random number in response to a call to a random function in the query slice, the random number being a number in the master random number sequence selected based on the step size and offset.

12. The method of claim 11, wherein determining the step size comprises designating a product of the count of query slices and the count of segment nodes of the parallel processing database system as the step size.

13. The method claim 11, wherein dispatching each query slice to at least one of the segment nodes comprises: dispatching each distributed slice to each segment node, and dispatching each singleton slice to one of the segment nodes.

14. The method of claim 11, wherein:

a master node parallel processing database system dispatches a common seed value to each segment from a master node of said database, and executing the query slices comprises generating the master random number sequence at each segment node using the common seed and selecting a subset of random numbers from the master random number sequence using the step size, the offset, and a position of each segment node in the ordered list of segment nodes.

15. The method of claim 11, wherein the list of query slices is ordered by identifier of each query slice, and the list of segment nodes is ordered by identifier of each query slice.

16. A non-transitory computer-readable medium storing instructions to cause a plurality of processors to perform operations comprising:

receiving a query plan, the query plan specifying that a relational database query is partitioned into one or more query slices, each query slice being a portion of operations of the query, each query slice being executable on a segment node independently of another portion of the query, the segment node being a node of a parallel processing database system comprising a plurality of nodes each having a processor that is independent of a processor of another node, each query slice being a singleton slice or a distributed slice, wherein the singleton slice is executable on one segment node of the parallel processing database system and the distributed slice is executable on each segment node of the parallel processing database system;

determining a partition plan of partitioning a master random number sequence to each of the segment nodes, wherein determining the partition plan comprises determining a step size based on a count of query slices and a count of segment nodes of the parallel processing database system, wherein the step size in the partition plan is usable to specify uncorrelated subsets of the master random sequence for each different combination of a query slice and a segment node, and wherein a larger count of query slices and a larger count of segment nodes correspond to a larger step size, wherein the step size is determined based on calculations comprising:

multiplying the count of segment nodes by a number of distributed slices among the one or more query slices; and designating a sum of a count of singleton slices and a product of the multiplying as the step size;

dispatching each query slice to at least one of the segment nodes according to the partition plan, including designating a different subset of the master random sequence to each different query slice and segment node combination based on the step size and an offset, each offset corresponding to a position of a segment node in an ordered list of segment nodes and a position of the query slice in an order list of query slices; and executing each query slice, including returning a random number in response to a call to a random function in the query slice, the random number being a number in the master random number sequence selected based on the step size and offset.

17. The non-transitory computer-readable medium of claim 16, wherein determining the step size comprises designating a product of the count of query slices and the count of nodes of the parallel processing database system as the step size.

18. The non-transitory computer-readable medium claim 16, wherein dispatching each query slice to at least one of the segment nodes comprises: dispatching each distributed slice to each segment node, and dispatching each singleton slice to one of the segment nodes.

19. The non-transitory computer-readable medium of claim 16, wherein:
a master node parallel processing database system dispatches a common seed value to each segment from a master node of said database, and
executing the query slices comprises generating the master random number sequence at each segment node using the common seed and selecting a subset of random numbers from the master random number sequence using the step size, the offset, and an identifier of a node on which the corresponding query slice executes.

20. The non-transitory computer-readable medium of claim 16, wherein the list of query slices is ordered by identifier of each query slice, and the list of segment nodes is ordered by identifier of each query slice.

21. A system comprising:
a plurality of processors; and
a non-transitory computer-readable medium storing instructions to cause the processors to perform operations comprising:
receiving, by a computing device, a query plan, the query plan specifying that a relational database query is partitioned into one or more query slices, each query slice being a portion of operations of the query, each query slice being executable on one or more segment nodes independently of another query slice, each segment node being a node of a parallel processing database system comprising a plurality of nodes each having a processor that is independent of a processor of another node, each query slice being a singleton slice or a distributed slice, wherein the singleton slice is executable on one segment node of the parallel processing database system and the distributed slice is executable on each segment node of the parallel processing database system;
determining a partition plan of partitioning a master random number sequence to each of the segment nodes, wherein determining the partition plan comprises determining a step size based on a count of query slices and a count of segment nodes of the parallel processing database system, wherein the step size in the partition plan is usable to specify uncorrelated subsets of the master random sequence for each different combination of a query slice and a segment node, and wherein a larger count of query slices and a larger count of segment nodes correspond to a larger step size, wherein the step size is determined based on calculations comprising:
multiplying the count of segment nodes by a number of distributed slices among the one or more query slices; and
designating a sum of a count of singleton slices and a product of the multiplying as the step size;
dispatching each query slice to at least one of the segment nodes according to the partition plan, including designating a different subset of the master random sequence to each different query slice and segment node combination based on the step size and an offset, each offset corresponding to a position of a segment node in an ordered list of segment nodes and a position of the query slice in an order list of query slices; and
executing each query slice, including returning a random number in response to a call to a random function in the query slice, the random number being a number in the master random number sequence selected based on the step size and offset.

22. The system of claim 21, wherein determining the step size comprises designating a product of the count of query slices and the count of segment nodes of the parallel processing database system as the step size.

23. The system of claim 21, wherein dispatching each query slice to at least one of the segment nodes comprises: dispatching each distributed slice to each segment node, and dispatching each singleton slice to one of the segment nodes.

24. The system of claim 21, wherein:
a master node parallel processing database system dispatches a common seed value to each segment from a master node of said database, and
executing the query slices comprises generating the master random number sequence at each segment node using the common seed and selecting a subset of random numbers from the master random number sequence using the step size, the offset, and a position of each segment node in the ordered list of segment nodes.

25. The system of claim 21, wherein the list of query slices is ordered by identifier of each query slice, and the list of segment nodes is ordered by identifier of each query slice.

* * * * *

UNITED STATES PATENT AND TRADEMARK OFFICE
CERTIFICATE OF CORRECTION

PATENT NO. : 10,061,562 B2
APPLICATION NO. : 14/431749
DATED : August 28, 2018
INVENTOR(S) : Hitoshi Harada, Caleb E. Welton and Florian Schoppmann Page 1 of 1

It is certified that error appears in the above-identified patent and that said Letters Patent is hereby corrected as shown below:

On the Title Page

At item (57) Abstract, Column 2, Line 11: Delete "segments," and insert --segments--, therefor.

In the Claims

Column 13, Line 56, in Claim 13: After "method" insert --of--.

Column 14, Line 6, in Claim 15: Delete "query slice" and insert --segment node--, therefor.

Column 14, Line 63, in Claim 18: After "medium" insert --of--.

Column 15, Line 16, in Claim 20: Delete "query slice" and insert --segment node--, therefor.

Column 16, Line 45, in Claim 25: Delete "query slice" and insert --segment node--, therefor.

Signed and Sealed this
Thirtieth Day of October, 2018

Andrei Iancu
*Director of the United States Patent and Trademark Office*